Jan. 17, 1939.  C. A. SWANSTROM  2,144,350
FASTENING MEANS
Original Filed June 27, 1935
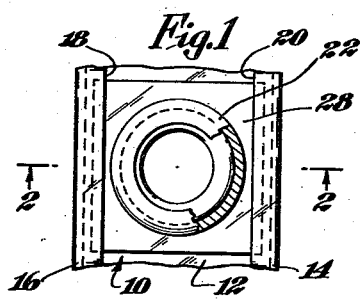
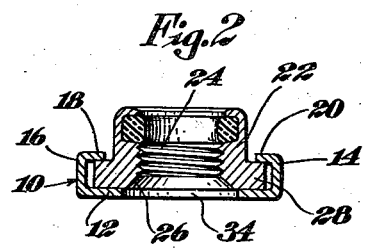
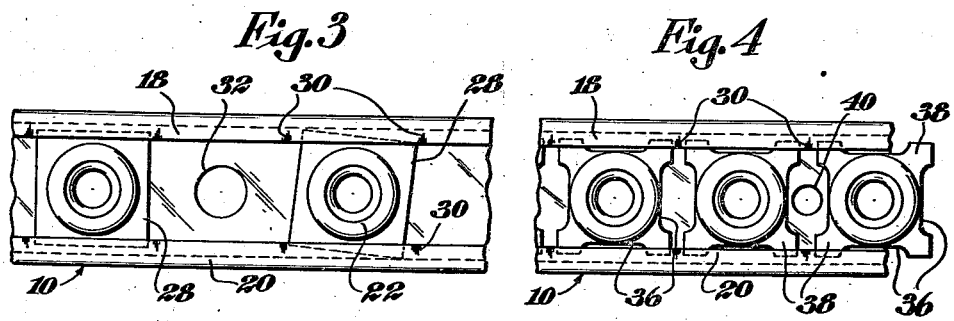
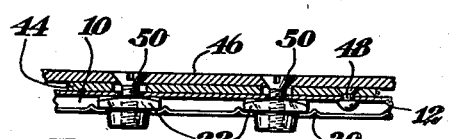
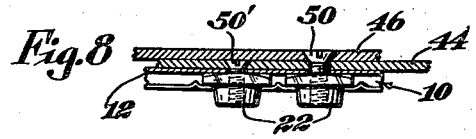
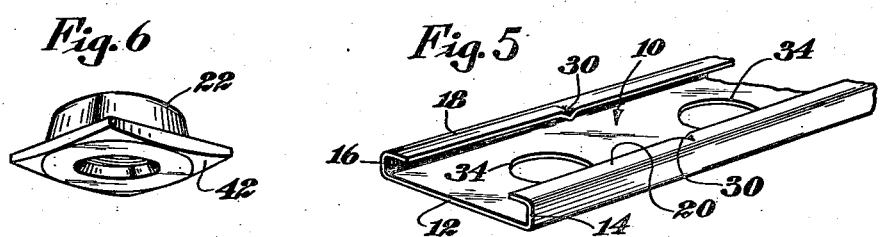
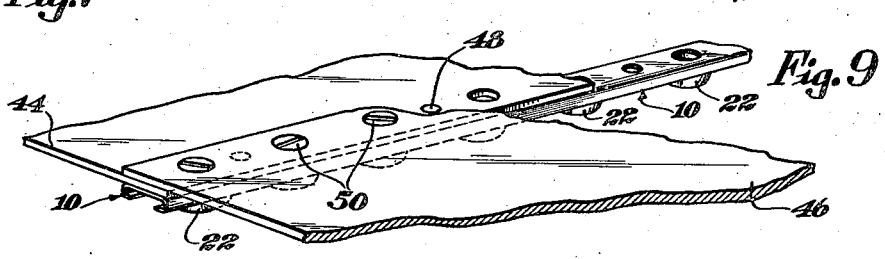
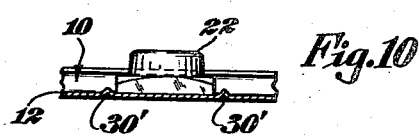
INVENTOR.
Carl A. Swanstrom
BY
James C. Markle
ATTORNEY.

Patented Jan. 17, 1939

2,144,350

UNITED STATES PATENT OFFICE 2,144,350

FASTENING MEANS

Carl A. Swanstrom, Irvington, N. J., assignor to Elastic Stop Nut Corporation, Elizabeth, N. J., a corporation of New Jersey Application June 27, 1935, Serial No. 28,610
Renewed November 30, 1938

9 Claims. (Cl. 85—32)

The present invention relates to fastening means and has particular reference to improved anchor nut structure adapted to be employed where bolts and nuts are used to removably secure together different parts of a larger structure.

The invention is particularly applicable for use in construction where the nature of the parts to be secured together is such that a so-called blind fastening is necessary, as for example where it is desired to secure by means of bolts or studs the edges of a removable plate the edges of which overlap the structure to which it is attached. This arrangement of parts is frequently found in aircraft, where the anchoring parts to which the removable parts are to be bolted are plates of such light construction that the anchoring structure can not be tapped for retaining threads, and nuts must be employed on the rearward or blind side of such anchoring structure, which side may be completely inaccessible when the removable plate is placed in the position in which it is to be secured.

In accordance with a preferred form of the present invention, an anchor member is provided which comprises a channel having secured therein, in a manner to be more fully described hereinafter, a plurality of nuts which are preferably of the self-locking variety. This anchor member is adapted to be secured to the under or blind side of one of the parts to be secured together by the fastening means so that bolts passing through the parts may readily be screwed into the nuts which are retained in their proper positions by the anchor member.

For a better understanding of the invention and the advantages to be derived from its use, reference may best be had to the ensuing description of suitable embodiments of structure for carrying the invention into effect, illustrated in the accompanying drawing forming a part of this specification.

In the drawing, Fig. 1 is a plan view of a portion of fastening means embodying the invention;

Fig. 2 is a section taken on line 2—2 of Fig. 1;

Fig. 3 is a plan view similar to Fig. 1;

Fig. 4 is a plan view similar to Fig. 3, showing a different shape and spacing of nuts;

Fig. 5 is a perspective of a section of channel strip suitable for use in practicing the invention;

Fig. 6 is a perspective of a form of nut contemplated by the invention;

Fig. 7 is a section of plate structure secured together in accordance with the invention;

Fig. 8 is a section similar to Fig. 7 showing a different mode of attaching the anchor member to a part to be secured;

Fig. 9 is a perspective of structure shown in section in Fig. 8; and

Fig. 10 is a section showing a different way of securing nuts in an anchor member of channel strip form.

Referring now to the drawing, the reference numeral 10 designates a channel strip having a web portion 12 and side flanges 14 and 16 which have inturned portions 18 and 20 respectively. In the channel thus formed, there is located a series of nuts 22 which are advantageously of the self-locking variety and which preferably are of the form shown in Fig. 2 in which a washer of non-metallic material such as fibre is retained in the nut at one end of the threaded bore 24, the opposite end of which is advantageously countersunk as at 26.

Preferably the nuts are formed with a flange base portion 28 constituting the retained portion of the nut and such base portion is preferably relatively thin.

The form of the retained or base portion of the nut may vary widely within the scope of the invention but it is essential that this portion be other than circular in form and so dimensioned that at least one transverse dimension is greater than the inside transverse distance between the side flanges of the channel. An advantageous form of the retained portion of the nuts is generally rectangular in shape and when it is of this form the distance across the flats of the base is somewhat less than the inside width of the channel so as to permit the nuts to have a limited movement transversely of the channel when the retained portions of the nuts are inserted under the inturned portions of the side flanges.

In the illustrated embodiment of the invention, the channel 10 is made in the form of a continuous strip of any desired length and a plurality of the nuts are inserted in the channel and retained at predetermined spaced intervals by deforming the channel at spaced intervals to limit the longitudinal movement of each nut in the channel and to permit each nut to have a small amount of such longitudinal movement. Advantageously such deformation consists in bending or crimping the inturned portions of the side flanges as shown at 30 in Figs. 3 to 5. The web 12 may however be deformed as shown at 30' in Fig. 10. It will be apparent that the strip thus constitutes an anchor member for the nuts.

The spacing of the nuts longitudinally of the strip will vary in accordance with the character of the fastening for which the strip is intended to be used. As shown in Fig. 3, the nuts are comparatively widely spaced apart and between the nuts at desired intervals there are advantageously provided openings 32 for fastening means to secure the strip to the part to which it is to be fastened. Fastening may be by screwing, riveting or in any other suitable manner. The strip can if desired be spotwelded to the part to which it is to be secured.

A series of apertures 34 is provided in the web of the channel, these apertures registering with the bores of the nuts and being of sufficiently larger diameter than the threaded bores of the nuts to insure their registering with these bores in any of the positions of limited movement of the individual nuts.

The limited movement permitted for the nuts compensates for misalignment in securing the channel strip in position and renders it easy and practical to insert the bolts or studs in the bores of the nuts in their blind location.

The construction is particularly well adapted for use where extreme lightness of the parts is desired, even when the parts to be secured together require the placing of the fastening studs at very close intervals.

In Fig. 4, I have shown a form of construction which is particularly well adapted for constructions where weight is of importance. As will be noted from the drawing, the channel is very shallow as compared with its width and the base portions of the nuts are formed as thin flanges adapted to fit within the shallow channel. Further, the side faces of the base flanges of the nuts are cut away as at 36 to provide what are in effect corner projections 38 which act to prevent rotation of the nuts within the channel. Cutting away of the side faces also provides for sufficient space between adjacent nuts at the center of the channel web to permit unobstructed access to an opening such as indicated at 40 for fastening the strip to another part, even when, as shown in Fig. 4, the nuts are placed together as closely as possible while still having some longitudinal movement within the channel.

To further secure lightness of construction, the flanges on the nuts may be beveled as indicated at 42 in Figs. 6 and 10.

In Figs. 7 and 9, I have shown a typical arrangement illustrating the manner in which the channel strip is employed in practice. In this figure, 44 designates a thin plate to which there is secured a cover plate or other like removable member 46. To the under side of the plate 44 the channel strip 10 is secured as by means of rivets 48 which are spaced at desired intervals. The nuts 22 are retained in the channel in the manner already described and it will be evident from the drawing that the removable member may be secured to or released from the plate 44 by screwing or unscrewing the bolts 50. As previously pointed out, it will be evident that means for fastening the strip other than rivets 48 may be employed and if desired the strip may be secured, as shown in Fig. 8, by means of one or more bolts 50', the heads of which are seated in the plate 44 rather than in the detachable plate and which bolts engage some of the nuts forming a part of the strip assembly to hold the strip in position with respect to the plate to which it is secured.

The amount of force exerted by the nuts against the side flanges of the strip due to the tendency of the nuts to turn with the bolts as they are screwed home is comparatively slight and consequently it is possible to make the strip of very light material having relatively low strength. For aircraft use, it is advantageous to make the anchor member of aluminum or an alloy of aluminum such for instance as duralumin, while the nuts are made of a denser and stronger material such as steel.

It will be evident to those skilled in the art that the strip form of anchor member provided by the present invention is extremely convenient in its application since the strip can be furnished in long continuous lengths which may be cut or broken to desired lengths retaining one or more nuts as required and secured wherever desired to a part which is to be fastened to another part of the fastening means.

I claim:

1. A multiple nut structure comprising a nut holding member providing a channel and a plurality of nuts situated in said channel, said member and said nuts having portions cooperating to loosely retain the nuts with limited movement in the channel and to constrain them against rotation in the channel.

2. A multiple nut structure comprising a nut holding member providing a channel having a web portion and side flanges, a plurality of nuts having retained portions situated in said channel between said side flanges, said retained portions having a transverse dimension greater than the transverse dimension of said channel, whereby to prevent rotation of the nuts in the channel, said member being deformed between adjacent nuts to confine the nuts within predetermined spaces in the channel and said web portion having a series of spaced apertures registering with the bores of the nuts.

3. A multiple nut structure comprising a nut holding strip providing a channel having a web portion and side flanges, said side flanges having inturned portions to provide a channel relatively shallow as compared with its width and a plurality of nuts having thin base portions situated in said channel, said base portions being formed with a transverse dimension greater than the transverse width of the channel, whereby to prevent turning of the nuts in the channel, said strip being deformed at spaced intervals to confine each nut to a predetermined space in the channel and said web portion having a series of spaced apertures registering with the bores of the nuts.

4. A multiple nut structure comprising a strip member providing a channel having a web portion and side flanges, a plurality of nuts situated in said channel, said nuts having retained portions dimensioned to permit limited movement of the nuts in the channel and to prevent rotation of the nuts in the channel, said side flanges having inturned portions overlying the retained portions of the nuts to hold the nuts in the channel, said nuts being confined to limited movement in the channel and having bores countersunk at the ends thereof in contact with said web portion and said web portion having a series of apertures of larger diameter than the bores of the nuts, said apertures registering with said bores in any of the positions of limited movement of the nuts.

5. A multiple nut structure comprising a nut holding strip member providing a channel having a web portion and side flanges, a plurality of nuts situated in said channel, said nuts having flanged base portions and the side flanges of the channel having inturned portions overlying said base portions to retain the nuts in the channel, the nuts being relatively closely spaced and confronting portions of bases of adjacent nuts being cut away to provide space for an unobstructed opening in the web portion of the channel between adjacent nuts and said web portion having a series of spaced apertures registering with the bores of the nuts.

6. Anchor nut structure comprising a nut having a main body portion and a flange portion relatively thin as compared with the body portion and projecting laterally from the base of the main body portion; and an anchor member of thin sheet metal having an apertured base portion underlying the nut, an anchoring portion extending from said base portion, and nut securing portions at opposite sides of said base portion, said nut securing portions being bent up from said base portion and over certain parts of the flange portion of the nut to hold the nut and anchor member in assembled relation and to permit limited movement of the nut relative to the anchor member.

7. Self-locking anchor nut structure comprising a self-locking nut having a main body portion and a flange portion projecting laterally therefrom, said main body portion having therein a locking insert adapted to frictionally engage the thread of a bolt passing through the nut; and a sheet metal anchor member having a base portion underlying the nut, and nut securing portions bent up and over certain parts of the flange portion of the nut at opposite sides of the nut, said bent up portions engaging the flange portions of the nut to prevent rotation of the nut with respect to the anchor member and to permit lateral movement of the nut within the anchor member.

8. Multiple anchor nut structure comprising a plurality of nuts each having a main body portion and a flange portion projecting laterally therefrom; and an elongated sheet metal anchor member having a base portion underlying said nuts, and nut securing portions bent up and over certain parts of the flange portions of the nuts at the respective opposite sides thereof, said bent up portions of said anchor member engaging the flange portions of the nuts to prevent rotation of the nuts with respect to the anchor member and to permit lateral movement of the nuts within the anchor member, the bent up portions of said anchor member being formed to hold the nuts in laterally spaced relation therein.

9. Multiple anchor nut structure comprising a plurality of nuts each having a main body portion and a flange portion projecting laterally therefrom; and an elongated sheet metal anchor member having a base portion underlying said nuts, and nut securing portions bent up and over certain parts of the flange portions of the nuts at the respective opposite sides thereof, said bent up portions of said anchor member engaging the flange portions of the nuts to prevent rotation of the nuts with respect to the anchor member and to permit lateral movement of the nuts within the anchor member, the bent up portions of said anchor member being formed to hold the nuts in laterally spaced relation therein, and the base portion of the anchor member between at least certain of said spaced nuts being apertured to accommodate means for securing the anchor member to another structure.

CARL A. SWANSTROM.